(12) United States Patent
Nogueira-Nine (10) Patent No.: US 9,857,463 B2
(45) Date of Patent: Jan. 2, 2018

(54) RADAR APPARATUS AND METHOD

(71) Applicant: Sony Corporation, Minato-ku (JP)

(72) Inventor: Juan Nogueira-Nine, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 469 days.

(21) Appl. No.: 14/056,045

(22) Filed: Oct. 17, 2013

(65) Prior Publication Data

US 2014/0247181 A1  Sep. 4, 2014

(30) Foreign Application Priority Data

Nov. 12, 2012 (EP) .................................. 12192233

(51) Int. Cl.
*G01S 13/90* (2006.01)
*G01S 13/26* (2006.01)
*G01S 13/34* (2006.01)

(52) U.S. Cl.
CPC .............. *G01S 13/90* (2013.01); *G01S 13/26* (2013.01); *G01S 13/343* (2013.01)

(58) Field of Classification Search
CPC ................... G01S 13/343; G01S 13/26; G01S 13/90–13/9094; G01S 7/411
See application file for complete search history.

(56) References Cited

U.S. PATENT DOCUMENTS

| | | | |
|---|---|---|---|
| 7,928,893 B2 | 4/2011 | Baraniuk et al. | |
| 8,570,208 B2 * | 10/2013 | Sarkis | A61B 5/0507 342/179 |
| 2011/0080316 A1 | 4/2011 | Erkocevic-Pribic et al. | |
| 2011/0175770 A1 | 7/2011 | Boufounos et al. | |
| 2012/0313810 A1 | 12/2012 | Nogueira-Nine | |

(Continued)

FOREIGN PATENT DOCUMENTS

CN   102207547   10/2011

OTHER PUBLICATIONS

Liu Kang, Liao Mingsheng, Timo Balz. High Resolution 3D Tomographic SAR with Compressive Sensing[J]. Geomatics and Information Science of Wuhan University, Dec. 2012, vol. 37, No. 12. pp. 1456-1459.*

(Continued)

*Primary Examiner* — Matthew M Barker
(74) *Attorney, Agent, or Firm* — Oblon, McClelland, Maier & Neustadt, L.L.P.

(57) ABSTRACT

A radar apparatus for obtaining a higher resolution than conventional SAR apparatus without increasing the bandwidth comprises a transmitter antenna and a receiver antenna. A mixer mixes said receive signal with said transmit signal to obtain a mixed receive signal, and a sampling unit samples said mixed receive signal to obtain receive signal samples from a period of said receive signal. A processor processes said receive signal samples by defining a spatial grid in the scene with a finer grid resolution than obtainable by application of a synthetic aperture radar algorithm on the receive signal samples and determining reflectivity values at grid points of said spatial grid by defining a signal model including the relative geometry of said transmitter antenna and said receiver antenna with respect to the scene, said transmit signal and said spatial grid and applying compressive sensing on said receive signal using said signal model.

16 Claims, 8 Drawing Sheets

(56) References Cited

U.S. PATENT DOCUMENTS

| | | | | |
|---|---|---|---|---|
| 2013/0226509 | A1* | 8/2013 | Boufounos | G01S 17/89 |
| | | | | 702/150 |
| 2014/0077989 | A1* | 3/2014 | Healy, Jr. | G01S 13/9035 |
| | | | | 342/25 F |
| 2014/0111372 | A1* | 4/2014 | Wu | G01S 7/418 |
| | | | | 342/146 |
| 2014/0232591 | A1* | 8/2014 | Liu | G01S 13/9035 |
| | | | | 342/25 F |

OTHER PUBLICATIONS

Qilian Liang, "Compressive Sensing for Synthetic Aperture Radar in Fast-Time and Slow-Time Domains". 2011 Conference Record of the Forty Fifth Asilomar Conference on Signals, Systems and Computers. pp. 1479-1483, Nov. 6-9, 2011. doi: 10.1109/ACSSC.2011.6190264.*

U.S. Appl. No. 13/486,317, filed Jun. 1, 2012, Juan Nogueira-Nine.

U.S. Appl. No. 13/944,287, filed Jul. 17, 2013, Juan Nogueira-Nine.

Riafeni Karlina et al. "Compressive Sensing for 2D Scan GB-SAR System", 1st international workshop in Compressed Sensing applied to Radar, May 14-16, 2012, Germany, 7 pages.

Ivana Stojanovic et al. "Compressed sensing of mono-static and multi-static SAR", Algorithms for Synthetic Aperture Radar Imagery XVI, Proc. of SPIE, vol. 7337 733705-1, 2009, 12 pages.

Matthew A. Herman et al. "High-Resolution Radar via Compressed Sensing", To appear in IEEE Transactions on Signal Processing, 2008, 10 pages.

Andreas Keil et al. "All-electronic 3D THz synthetic reconstruction imaging system", 36th international conference on Infrared, Millimeter and Terahertz Waves (IRMMW-THz) Oct. 2-7, 2011, 2 pages.

Richard G. Baraniuk "Compressive Sensing", IEEE Signal Processing Magazine, Jul. 2007, 4 pages.

David L. Donoho "Compressed Sensing", IEEE Transaction on Information Theory, vol. 52, No. 4, Apr. 2006, 18 pages.

Michael Lustig et al. "Compressed Sensing MRI", Signal Processing Magazine, vol. 25, Issue 2, Mar. 2008,11 pages.

Vishal M. Patel et al. "Compressed Synthetic Aperture Radar", IEEE Journal of Selected Topics in Signal Processing, vol. 4, No. 2, Apr. 2010, 11 pages.

Scott Shaobing Chen et al. "Atomic Decomposition by Basis Pursuit", SIAM J. Sci. Comput. 20 (1999), 29 pages.

Kristen Michelle Cheman "Optimization Techniques for Solving Basis Pursuit Problems", PH.D Thesis, North Carolina State University, Mar. 2006, 39 pages.

Seung-Jean Kim et al. "An Interior-Point Method for Large-Scale $\lambda_1$—Regularized Least Squares", IEEE Journal of Selected Topics in Signal Processing, vol. 1, No. 4, Dec. 2007, 12 pages.

Graham M Brooker "Understanding Millimetre Wave FMCW Radars", 1st International Conference on Sensing Technology, Nov. 21-23, 2005,6 pages.

Ken B. Cooper et al. "Penetrating 3-D Imaging at 4- and 25-m Range Using a Submillimeter-Wave Radar", IEEE Transactions on Microwave Theory and Techniques, vol. 56, No. 12, Dec. 2008, 8 pages.

Emmanuel Candes et al. "Robust Uncertainty Principles: Exact Signal Reconstruction from Highly Incomplete Frequency Information", IEEE Transactions on Information Theory, vol. 52, 2006, 41 pages.

Emmanuel J. Candes et al. "An introduction to Compressive Sampling", IEEE Signal Processing Magazine, Mar. 2008, 10 pages.

"SeDuMi", upgraded website, written by Imre Polik, Jun. 10, 2010; http://sedumi.ie.lehigh.edu/, 2 pages.

* cited by examiner

RADAR APPARATUS AND METHOD

BACKGROUND

Field of the Disclosure

The present disclosure relates to a radar apparatus and a corresponding radar method. Further, the present disclosure relates to a processing apparatus and method for use in such a radar apparatus and method, respectively. Still further, the present disclosure relates to a computer program for implementing said processing method and to a computer readable non-transitory medium storing such a computer program.

Description of Related Art

Synthetic aperture radar (SAR) is a common technique used in radar applications like remote sensing or radar imaging because it allows increasing the effective aperture of a certain antenna by moving it over the surface to be sensed/imaged, or the scatter to be detected. As the radar antenna passes over a given scatter, many pulses are transmitted from the transmitter antenna in sequence and the reflected signals are recorded by a receiver antenna. By combining these individual signals, a synthetic aperture is created which provides a much improved resolution in the azimuth resolution. The received echoes contain full phase and amplitude information of the scene reflectivity, but the image reconstructed from that signals is unfocused, due to the phase differences among the acquired signals caused by the different propagation time at each antenna position. Using signal processing techniques, the image is focused by correcting these phase differences, to obtain the improved resolution provided by the antenna movement. Another important benefit of SAR is that the theoretical achievable spatial resolution in the direction of the movement only depends on the physical size of the antenna in the same direction.

The SAR technique is traditionally used by mounting an antenna or array of antennas in a spacecraft or airborne for applications like earth observation, topographic missions, agriculture, military recognition or surveillance, etc. The recent advances in the millimeter waves frequency range (30-300 GHz) towards miniaturization and system integration, mainly driven by the introduction of radar based driver assistance systems in the automotive industry, together with the growing demand for security applications for concealed weapons or explosive substances detection, have triggered an intense activity in the area of radar imaging. For such applications it is desirable to achieve improved resolution but in the two dimensions of the scene. This can be done by applying SAR in both directions and then synthesize the 2D image.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object of the present disclosure to provide a radar apparatus and method to enhance the spatial resolution of an unfocused 2D radar apparatus and method without increasing the bandwidth. It is a further object of the present disclosure to provide a corresponding processing device and method as well as a corresponding computer readable non-transitory medium storing a computer program.

According to an aspect of the present disclosure there is provided a radar apparatus comprising:
a transmitter antenna that transmits an unfocused frequency modulated transmit signal having a transmit bandwidth towards a scene potentially comprising one or more targets,
a receiver antenna that receives a receive signal reflected from said scene in response to the transmission of said transmit signal,
a mixer that mixes said receive signal with said transmit signal to obtain a mixed receive signal,
a sampling unit that samples said mixed receive signal to obtain receive signal samples from a period of said receive signal,
a processor that processes said receive signal samples by
defining a spatial grid in the scene with a finer grid resolution than obtainable by application of a synthetic aperture radar algorithm on the receive signal samples and
determining reflectivity values at grid points of said spatial grid by defining a signal model including the relative geometry of said transmitter antenna and said receiver antenna with respect to the scene, said transmit signal and said spatial grid and applying compressive sensing on said receive signal using said signal model.

According to a further aspect of the present disclosure there is provided a processor for use in a radar apparatus, in particular having a transmitter antenna that transmits an unfocused frequency modulated transmit signal having a transmit bandwidth towards a scene potentially comprising one or more targets, a receiver antenna that receives a receive signal reflected from said scene in response to the transmission of said transmit signal, a mixer that mixes said receive signal with said transmit signal to obtain a mixed receive signal, and a sampling unit that samples said mixed receive signal to obtain receive signal samples from a period of said receive signal,
wherein said processor is configured to processes said receive signal samples by
defining a spatial grid in the scene with a finer grid resolution than obtainable by application of a synthetic aperture radar algorithm on the receive signal samples and
determining reflectivity values at grid points of said spatial grid by defining a signal model including the relative geometry of said transmitter antenna and said receiver antenna with respect to the scene, said transmit signal and said spatial grid and applying compressive sensing on said receive signal using said signal model.

According to still further aspects corresponding methods, a computer program and a computer readable non-transitory medium having instructions stored thereon which, when carried out on a computer, cause the computer to perform the steps of the processing method according to the present disclosure are provided.

Preferred embodiments of the disclosure are defined in the dependent claims. It shall be understood that the claimed processor, the claimed methods and the claimed computer readable medium have similar and/or identical preferred embodiments as the claimed radar apparatus and as defined in the dependent claims.

The present disclosure is based on the idea to enhance the spatial resolution in a radar apparatus, in particular a 2D SAR apparatus, in comparison with conventional reconstruction algorithms, for the same scanning setup. It is proposed to build a model of the measurement process and then estimate the scene reflectivity by applying the well known principle of compressing sensing, particularly including the solving of an l1-regularization convex problem.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
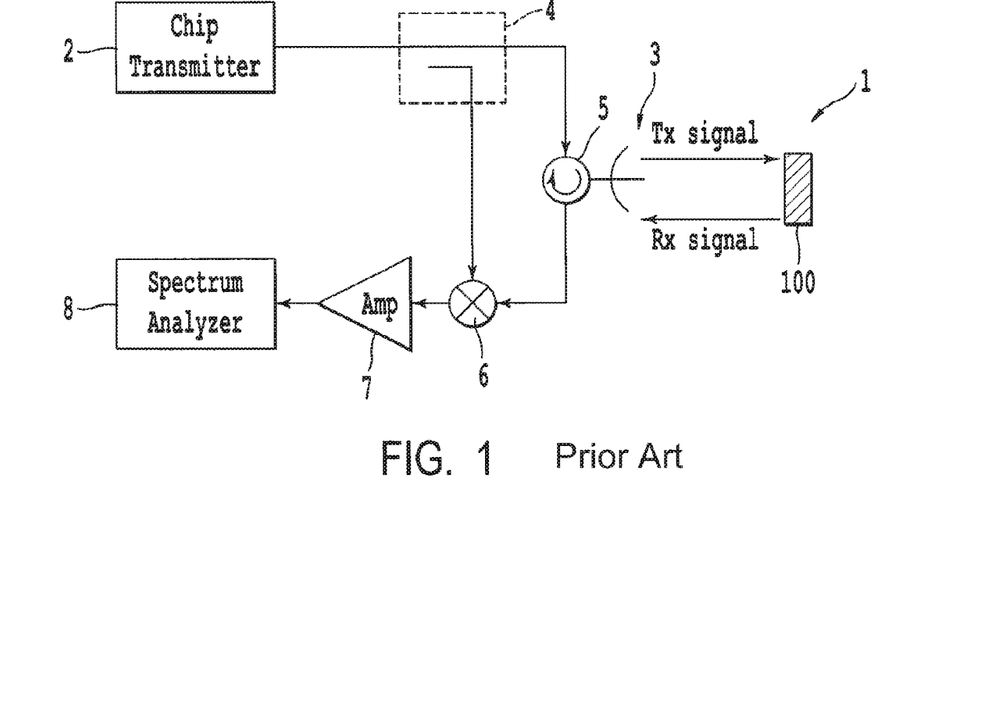
FIG. 1 shows an embodiment of a conventional FMCW radar apparatus.

Referring now to the drawings, wherein like reference numerals designate identical or corresponding parts throughout the several views, FIG. 1 shows an embodiment of a conventional FMCW radar apparatus 1 in which the above mentioned SAR technique can generally be applied. A thorough explanation of FMCW is given in G. Brooker, "Understanding Millimeter Wave FMCW Radars", 1st International Conference on Sensing Technology, Nov. 21-23, 2005, Palmerston North, New Zealand, p. 152-157. Such a FMCW radar 1 transmits a continuous wave signal that is frequency modulated (frequency is changing with time) to produce a chirp pulse by a chirp transmitter 2. This is transmitted to the object 100 (e.g. included in a scene) to be examined by a co-located (monostatic) antenna 3 and is also fed to the receiver via a coupler 4. Depending upon the properties of the object 100 the transmitted signal will be reflected by the object 100 and be received by the receiver of the FMCW radar, i.e. the co-located antenna 3. A duplexer or circulator 5 serves for time multiplexing the transmitting and receiving signals to/from the co-located antenna 3.

Since the transmitted chirp pulse is changing its frequency with time, the exact frequency received for a given time instant depends upon how far away the object is located and the corresponding flight time (Tp). This received signal is then mixed with the transmitted chirp (supplied to the mixer 6 via the coupler 4) and the output of the mixer 6 has a frequency which is the difference in frequency between the transmitted and received signal. This is known as the beat frequency ($f_b$) and is directly proportional to the distance between the FMCW radar and the object.

The beat frequency signal is then amplified by an amplifier 7 and (Nyquist) sampled and Fourier transformed using a spectrum analyser or FFT transforming unit 8 to get the frequency bins. These frequency bins are directly related to the range of the target.

Figure 2:
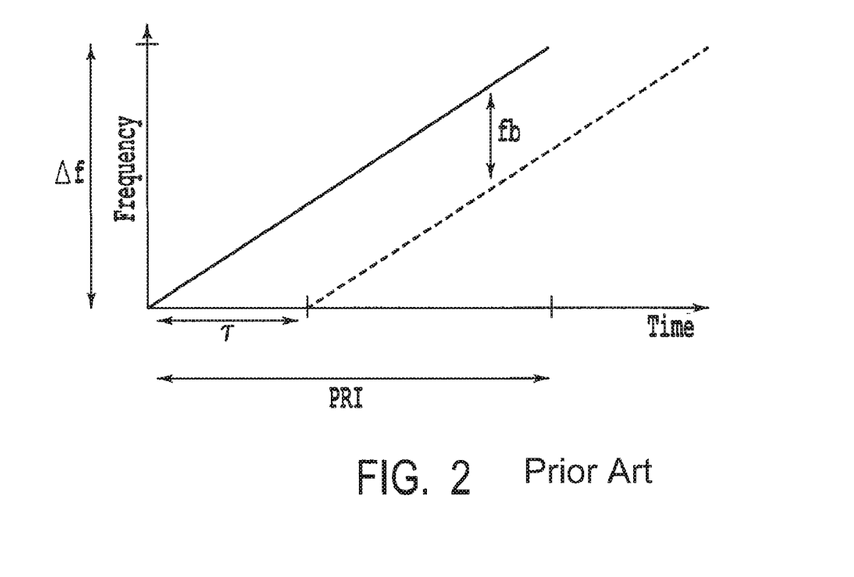
FIG. 2 shows a diagram of typical frequency against time waveforms for a conventional FMCW radar apparatus.

The frequency variation against time of the transmitter signal (chirp pulse) and the received signal are shown in FIG. 2 as solid and dotted lines respectively. The difference in frequency between the transmitted signal and the received, the beat frequency ($f_b$) is also labelled. As can be seen in FIG. 2, the frequency of the transmitted and received signal is varying with time. At each sampling point the frequency of the signal is generally known, and the bandwidth of the transmitted and received signal is limited for a given time instant. $\tau$ indicates the delay time between transmit and receive signal, PRI indicates the time period of one chirp signal, i.e. the pulse repetition interval.

A Frequency Modulated Continuous Wave (FMCW) radar imaging systems uses the range information to create a 3D image of the scene of interest, as is known from Ken B. Cooper, Robert J. Dengler, Nuria Llombart, Tomas Bryllert, Goutam Chattopadhyay, Erich Schlecht, John Gill, Choonsup Lee, Anders Skalare, Imran Mehdi, and Peter H. Siegel, "Penetrating 3-D Imaging at 4- and 25-m Range Using a SubmillimeterWave Radar", IEEE Transactions on Microwave Theory and Techniques, vol. 56, no. 12, December 2008. The system transmits a signal with a frequency sweep modulation, often called a chirp, at each scene position or pixel. The signal reflected by each scatter at one pixel is mixed with a copy of the transmitted signal, and the output of the mixer shows a frequency shift between both signals (also called beat frequency or intermediate frequency), which is directly proportional to the time delay, and hence to the distance to the scatter. Such a system usually creates an image of a 2D scene by displaying the power of the reflected signal of the pixels in the scene located at the same distance of the transceiver. Furthermore, the beat frequency at each pixel position provides us with depth information of the scene at that position. Displaying the scatters located at the same distances of the radar unit target we obtain a 2D view of the scene for each discrete distance. Therefore it is possible to display several layers (2D) in the depth direction of a 3D volume by using such information. How close these depth layers can be resolved depends upon the distance (range) resolution of the FMCW radar unit being used in the imaging system.

The range resolution of frequency modulated continuous wave (FMCW) radar systems is inversely proportional to the bandwidth, i.e. it holds $\delta R = c/(2BW)$ wherein R is the range, c is the speed of light and BW is the bandwidth. This range information is conventionally extracted by performing frequency domain analysis (e.g. by a Fast Fourier Transform (FFT) of the received mixed signal (beat frequency)). With this method the presence of a target is shown by a main lobe with the maximum located at the frequency beat corresponding to the range of the target. When two or more targets are closer to each other than the maximum range resolution of the radar, i.e. when the distance between two or more scatters (and the corresponding layers) is smaller than the maximum range resolution of the radar, this frequency based procedure is not able to distinguish among the main lobes corresponding to the different targets. This theoretical range resolution only depends of the bandwidth of the transmitted chirp, i.e. the higher the bandwidth, the better the range resolution.

If the used antenna is provided with some focus means (e.g. a lens or other optics) the reconstruction of the selected layer does not need further processing. But in a focused system, the range of layers that can be recovered depends on the employed focus means. Layers outside that focus range will be shown unfocused. The advantage of the synthetic focus in SAR systems is clear, as it is possible to reconstruct the image at any depth layer. An example of such a SAR imaging system is described in Keil, A. Hoyer, T., Peuser, J., Quast, H., Löffler, T., "All-electronic 3D THz synthetic reconstruction imaging system", 36th International Conference on Infrared, Millimeter and Terahertz Waves (IRMMW-THz), 2-7 Oct. 2011, where the scanning of the scene is done mechanically. But other solutions may include static two-dimensional antenna arrays where the synthetic aperture is achieved by combining the transmitting and receiving antennas sequentially. Whatever the case, the spatial geometry used for the measurements needs to be precisely included in the SAR image reconstruction algorithm, since otherwise the synthetic focus would fail.

The present disclosure proposes a radar apparatus and method that increase the spatial resolution of a 2D SAR system in comparison with traditional reconstruction algorithms, for the same scanning setup. The proposed radar apparatus and method substantially build a model of the measurement process and then estimate the scene reflectivity by use of compressive sensing. Before details of the present disclosure are explained in more detail, the theory of CS shall be briefly explained.

The theory of CS basically states that a sparse signal x of length N in certain basis can be recovered exactly with high probability from only M measurements, where M<<N via l1-minimization. As a general rule, it has been found empirically, that if the signal x is K-sparse (only K of the N coefficients of x are non-zero), the number of needed measurements M is in the order of K*log N. Let $\Psi$ denote the basis matrix of the sparse signal (x=$\Psi$s), and let $\Phi$ denote a measurement matrix. The theory of CS demonstrates that it is possible to reconstruct the signal x from a small number o measurements y by solving the convex optimization problem:

$$\hat{s} = \min v s v_1 \text{ s.t. } y = \Phi x = \Phi \Psi s = \Theta s \tag{1}$$

where s is a sparse vector with only K valid coefficients, and $\Phi$ is a M×N matrix with M<<N. Another condition that must be satisfied, besides the sparsity of the signal, is the restricted isometry property (RIP) that states that the reconstruction of the signal would be successful only if the matrix $\Theta$ satisfies:

$$1 - \varepsilon \leq \frac{\|\Theta v\|_2}{\|v\|_2} \leq 1 + \varepsilon \tag{2}$$

where v is an arbitrary sparse signal and $\epsilon$>0. A related property, much easier to prove is known as the incoherence property which states that the lower the coherence between the representation matrix $\Psi$ and the measurement matrix $\Phi$ is, the higher would be the probability of a perfect reconstruction. The coherence $\mu$ is defined as:

$$\mu(\Phi, \Psi) = \sqrt{n} \cdot \max_{1 \leq k, j \leq n} |\langle \varphi_k, \psi_j \rangle| \tag{3}$$

In other words, the coherence measures the largest correlation between any two elements of $\Psi$ and $\Phi$. Detailed explanations of the theory of compressive sensing can, for instance, be found in E. Candes, J. Romberg, and T. Tao, "Robust uncertainty principles: Exact signal reconstruction from highly incomplete frequency information," IEEE Transactions on Information Theory, vol. 52, pp. 489-509, 2006, D. Donoho, "Compressed sensing," IEEE Transactions on Information Theory, vol. 52, pp. 1289-1306, 2006, or Emmanuel J. Candés and Michael B. Wakin, "An introduction to compressive sampling", IEEE Signal Processing Magazine, pp. 21-30, March 2008.

In the conventional application of compressive sensing to a signal acquisition process, the goal is to reduce the number of measurements needed to recover or reconstruct the signal or image of interest with an acceptable (for the concrete application) quality. Reducing the number of measurements may have benefits like for example reducing the acquisition time, the number of sensors required and therefore the system complexity and the price, or the data storage needs. The present invention, however, proposes to exploit the super-resolution potential of compressive sensing by applying this technique in a different approach: instead of reducing the number of measurements to recover the original signal, all the available measurements are taken and a signal is reconstructed with a better quality (in some sense), in particular with an increased spatial resolution, than the one obtained with the conventional methods using the same source data.

Figure 3:
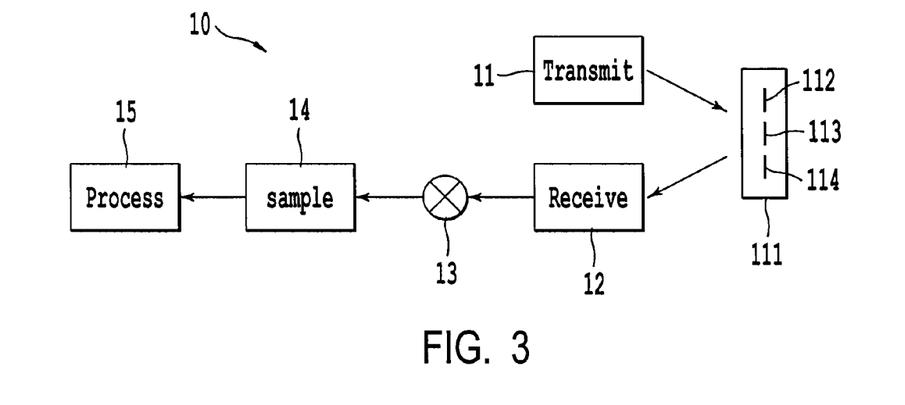
FIG. 3 shows an embodiment of a radar apparatus according to the present disclosure.

FIG. 3 shows a schematic diagram of the general layout of a radar apparatus 10 according to the present disclosure. It comprises a transmitter antenna 11 that transmits a frequency modulated transmit signal having a transmit bandwidth towards a scene 111 potentially comprising one or more targets 112, 113, 114, and a receiver antenna 12 that receives a receive signal reflected from said scene 111 in response to the transmission of said transmit signal. Further, the radar apparatus 10 comprises a mixer 13 that mixes said receive signal with said transmit signal to obtain a mixed receive signal and a sampling unit 14 that samples said mixed receive signal to obtain receive signal samples from a period of said receive signal. A processor 15 is provided that processes said receive signal samples by defining a spatial grid in the scene with a finer grid resolution than obtainable by application of a synthetic aperture radar algorithm on the receive signal samples and determining reflectivity values at grid points of said spatial grid by defining a signal model including the relative geometry of said transmitter antenna and said receiver antenna with respect to the scene, said transmit signal and said spatial grid and applying compressive sensing on said receive signal using said signal model.

In the embodiment of a FMCW radar, which shall be used herein for explaining the details of the present disclosure, CS is applied to all the data collected in the receiver to achieve a spatial resolution that is finer than the spatial resolution obtained when the data is processed in a conventional manner.

Figure 4:
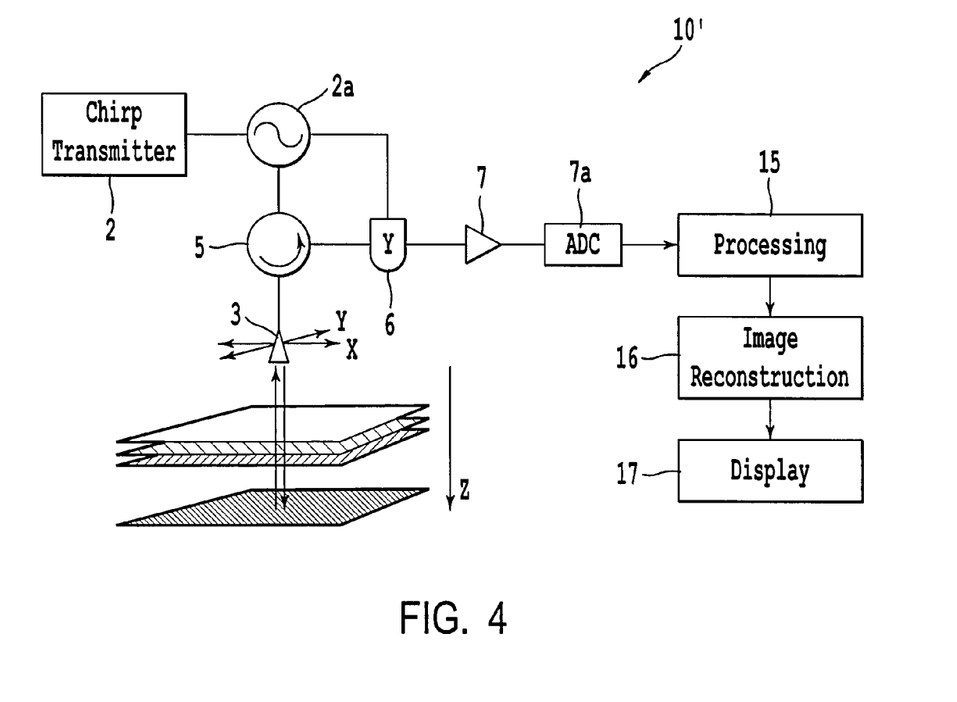
FIG. 4 shows another embodiment of a radar apparatus according to the present disclosure.

A more detailed embodiment of a radar apparatus 10' according to the present disclosure is schematically shown in FIG. 4. Here, for like elements the same reference numbers are used as in FIG. 1. Besides the VCO 2a in the transmitter path (which may also be provided in the conventional radar apparatus 1), the amplifier 7, the analog-to-digital converter (ADC) 7a and the processor 15 an optional reconstruction unit 16 for reconstructing an image from the obtained reflectivity values and an optional display 17 for displaying an image are provided.

In this embodiment of the radar apparatus 10' a co-located antenna 3 is used that alternately works as transmitter antenna and as receiver antenna. In other embodiments, however, separate transmitter and receiver antennas, antenna arrays and/or antennas using electronic beamforming or mechanical movement means for moving antennas for scanning the scene might be used.

To achieve higher spatial resolution it is proposed according to the present disclosure to define a spatial grid in the scene of interest with a finer resolution than the one that is possible to obtain with traditional SAR reconstruction methods. Once the spatial grid has been defined, a signal model including the transmitted frequency modulated signal, the antenna geometry and the defined grid points is created. To illustrate how to build such a model, the scenario depicted in FIG. 5 will be used as example, but the proposed idea can be applied to any device and method performing a non-focused 2D scan (SAR) of a scene by transmitting frequency modulated transmit signals, preferably FMCW chirp signals. In this context "non focused" or "unfocused" means that the radiation pattern of the transmitter antenna illuminates the scene without using any optic or electronic means that may concentrate (i.e. focus) the antenna beam to a much more reduced area. The focusing (of a constructed image) may be done later on synthetically as part of the reconstruction process.

Figure 5:
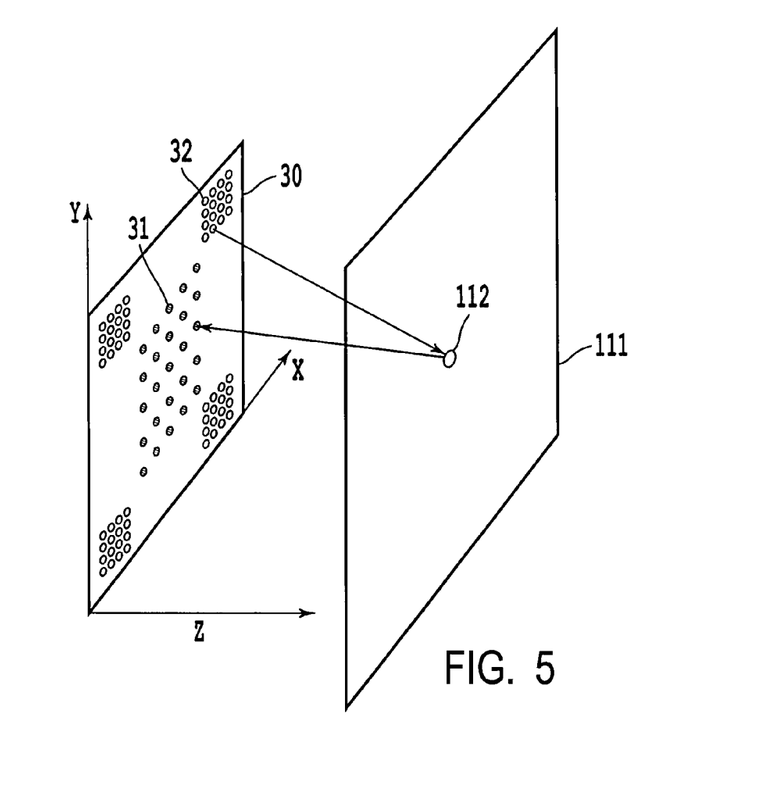
FIG. 5 shows a diagram illustrating the function of the radar apparatus according to the present disclosure.

The 2D antenna array 30 shown in FIG. 5 comprises a square of 5×5 receiver antenna elements 31, surrounded by four groups of 4×4 transmitter antenna elements 32. Following a predetermined time sequence, each transmitter antenna element 32 sends a FMCW chirp to the scene 111 (here comprising one point target 112) which is reflected back to the antenna array 30 conveying information about the scene's reflectivity profile. This makes a total of 1600 (25×64) possible measurements. Traditional SAR reconstruction algorithms just coherently combine the collected pulse returns along this synthetic aperture to create an image of the scene 111. In the method proposed here, however, a full mathematical model is created that describes all possible returns assuming a full distribution of scatters (i.e. targets) placed at the defined grid positions. The theory of compressive sensing is then applied to estimate, using the collected measurements, the position and the value of the scatters in the scene 111.

Preferably, the transmitter signal is a continuous ramp frequency chirp, but once the reflected signal is sampled at a receiver antenna element 31, these samples can be considered as a collection of pulses from a step frequency radar. Therefore, the signal S transmitted by the transmitter antenna element Ti(xti, yti, 0), reflected by a target at the position P(xp,yp,zp), received at the antenna Rn(xn, yn, 0) and sampled with frequency fs, at intervals kTs can be written as:

$$S(T_i, R_n, P, k) = \sigma(P) \cdot e^{j2\pi\left(f_0 \tau(T_i,R_n,P) + \alpha kT_s \tau(T_i,R_n,P) - \frac{1}{2}\alpha \tau^2_{(T_i,R_n,P)}\right)} \quad (1)$$

where $\alpha$=BW/PRI is the slope of the chirp given by the quotient between the chirp frequency excursion (or bandwidth) and the number of chirps transmitted per unit time, known as the pulse repetition rate (PRI) and $$\tau_{(T_i,R_n,P)} = \frac{\sqrt{(x_p - x_{ti})^2 + (y_p - y_{ti})^2 + z_p^2} + \sqrt{(x_p - x_m)^2 + (y_p - y_m)^2 + z_p^2}}{2} \quad (2)$$

is the propagation time of the signal.

To construct the measurement matrix for the signal model, the response of each possible transmitter antenna element and receiver antenna element combination (Na) is organized in one column, and this is done for each grid point defined in the scene grid (Ns). Na corresponds to the number of measurements (for the example in FIG. 5 this value is 1600), and Ns is defined using a resolution finer than the spatial resolution the system would be able to achieve using traditional SAR processing algorithms like match filter backprojection.

For defining the signal model, Rij shall be defined as the distance travelled by the transmitter signal using the transmitter-receiver antenna element combination number i (from Na different combinations), j shall be defined as the scene grid position (from Ns possibilities), and fk shall be defined for each one of the sampled frequencies by $$f_k = f_0 + \alpha kT_s \quad (3)$$

Further, yk shall be defined as a vector with all measurements taken using the Na antenna combinations for all Ns grid positions and one sampled frequency fk, and $\sigma$ the vector with the reflectivity values of the scene at each grid point. Therefore, for each one of these sampled frequency fk the signal model can be defined as:

$$\begin{bmatrix} y_{k1} \\ y_{k2} \\ y_{k3} \\ \vdots \\ y_{kN_a} \end{bmatrix} = \begin{bmatrix} e^{j2\pi \frac{R_{11}}{c}\left(f_k - \frac{\alpha R_{11}}{2c}\right)} & e^{j2\pi \frac{R_{21}}{c}\left(f_k - \frac{\alpha R_{21}}{2c}\right)} & \cdots & e^{j2\pi \frac{R_{N_a 1}}{c}\left(f_k - \frac{\alpha R_{N_a 1}}{2c}\right)} \\ e^{j2\pi \frac{R_{12}}{c}\left(f_k - \frac{\alpha R_{12}}{2c}\right)} & e^{j2\pi \frac{R_{22}}{c}\left(f_k - \frac{\alpha R_{22}}{2c}\right)} & \cdots & e^{j2\pi \frac{R_{N_a 2}}{c}\left(f_k - \frac{\alpha R_{N_a 2}}{2c}\right)} \\ e^{j2\pi \frac{R_{13}}{c}\left(f_k - \frac{\alpha R_{13}}{2c}\right)} & e^{j2\pi \frac{R_{23}}{c}\left(f_k - \frac{\alpha R_{23}}{2c}\right)} & \cdots & e^{j2\pi \frac{R_{N_a 2}}{c}\left(f_k - \frac{\alpha R_{N_a 2}}{2c}\right)} \\ \vdots & \vdots & \vdots & \\ e^{j2\pi \frac{R_{1N_s}}{c}\left(f_k - \frac{\alpha R_{1N_s}}{2c}\right)} & e^{j2\pi \frac{R_{2N_s}}{c}\left(f_k - \frac{\alpha R_{2N_s}}{2c}\right)} & \cdots & e^{j2\pi \frac{R_{N_a N_s}}{c}\left(f_k - \frac{\alpha R_{N_a N_s}}{2c}\right)} \end{bmatrix} \begin{bmatrix} \sigma_1 \\ \sigma_2 \\ \sigma_3 \\ \vdots \\ \sigma_{N_s} \end{bmatrix} \quad (4)$$

Obtaining σ from yk is an inverse problem with more unknowns than equations and therefore impossible to solve by traditional methods. Compressive sensing tries to solve such an inverse problem by looking for the sparsest vector σ that best fits within this model, given the received signal yk. Indeed, if the signal σ is actually sparse in some domain, compressive sensing would be able to estimate it with overwhelming probability by means of an l1-minimization algorithm. Preferably, here it is assumed that the number of targets or reflectivity points is limited and therefore sparse in the spatial domain, i.e. only some coefficients ai in the vector will be non-zero:

$$\hat{\sigma}=\min\|\sigma v\|_1 \text{ s.t. } y_k=\Phi\sigma \quad (5)$$

If the sparsity of the signal does not occur in the spatial domain, but in other transformed domain, it is therefore enough to introduce such a transformation during the recovery process as part of the minimization algorithm. For example, typical scenes in radar imaging for security applications may look more like a distributed target as compared to a group of dicrete, isolated scatters. In this case the utilization of the total variation transform will sparsify the scene.

Once the signal model has been defined the l1-regularization problem (5) has to be solved to obtain a solution a consistent with the observations yk. This is a convex optimization problem that can be conveniently reduced to a linear program problem and then solved e.g. via Basic Pursuit (as e.g. described in Chen, S. S., Donoho, D. L., Saunders, M. A, "Atomic decomposition by basis pursuit". SIAM J. Sci. Comput. 20 (1999), 33-61) or any other decomposition method (as e.g. described in Kristen Michelle Cheman, "Optimization techniques for solving basis pursuit problems", Ph. D Thesis, North Carolina State University, March, 2006). However, these linear solvers do not consider the presence of noise in the equation and therefore they are not able to find a sparse solution for the problem. To work in the presence of noise the problem is preferably reformulated to an alternative l1-minimization algorithm with unequal constraints:

$$\min\|\sigma\|_1 \text{ s.t. } \|\Phi\sigma-y_k\|_2\leq\epsilon \quad (6)$$

The main difference with the problem defined in (5) is that the reconstruction now has to be only consistent with the noise level. This is still a convex problem but it can be solved with a second order cone solver like SeDuMi (as e.g. currently be described at http://sedumi.ie.lehigh.edu/) or SDPT3 (as e.g. currently be described at (http://www.math-.nus.edu.sg/~mattohkc/sdpt3.html).

For large problems like this one that includes a big number of variables, a better estimator than defined in (6) for noisy data is the l1-regularized method "l1_ls" described by S.-J. Kim, K. Koh, M. Lustig, S. Boyd, and D. Gorinevsky, "An InteriorPoint Method for Large-Scale l1-Regularized Least Squares", IEEE Journal on Selected Topics in Signal Processing, 1(4):606-617, December 2007:

$$\min\|\Phi\sigma-y_k\|_2^2+\lambda\|\sigma\|_1 \quad (7)$$

The validity of the proposed radar device and method has been tested through simulations, and the results have been compared with a standard 2D SAR backprojection algorithm. Further, the independence of the radar device and method with the type of synthetic aperture antenna distribution being used during the acquisition process has been verified, as far as the corresponding geometry of such a 2D acquisition system is included in the compressive sensing signal model. Examples could be a single monostatic antenna using a mechanical displacement system to scan the complete 2D space, or any feasible combination of transmission and reception antenna elements in a 2D antenna array, like the one shown in FIG. 5 (wherein the number of receiver antenna elements 31 and transmitter antenna elements 32 is to understood as exemplary).

Figure 6:
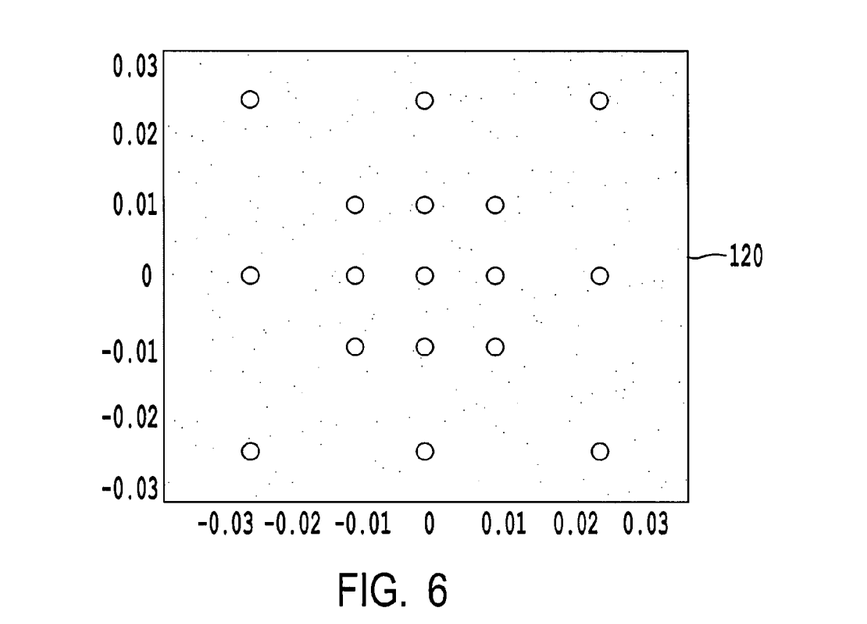
FIG. 6 shows a diagram illustrating a simulated scene having one layer.

The capability of the proposed device and method will be illustrated by means of an example using the two-dimensional synthetic antenna array shown in FIG. 5 with two simulated scenarios. The first simulated scenario comprises a scene 120 covering an area of 50×50 mm where 17 point targets with the same reflectivity have been placed according the distribution shown in FIG. 6. The resolution of a system using a 2D SAR standard backprojection algorithm is 1 cm in both dimensions, which is the minimum distance used between any two point scatters in the simulated scene 120 as can be seen in FIG. 6. The distance of the scene 120 to the antenna array is 50 cm. Furthermore, phase noise and background noise have been added to the simulation to have a reasonable SNR in the order of 30 dB.

Figure 7:
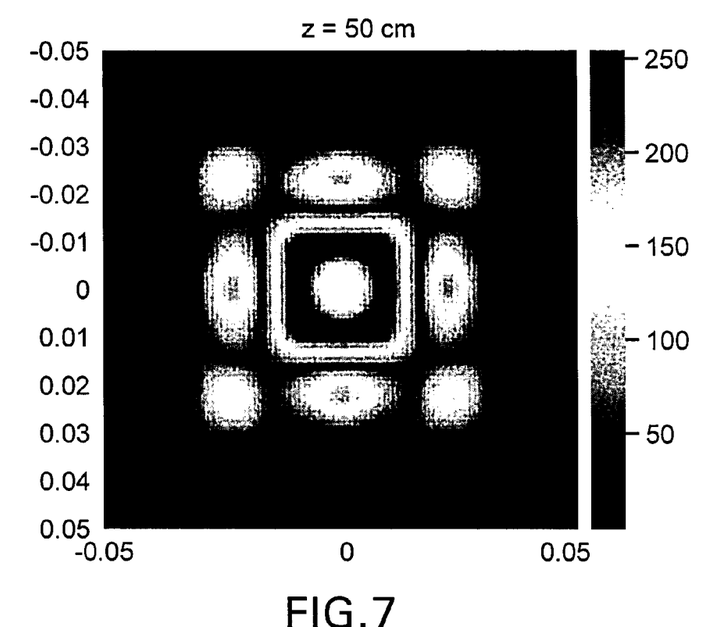
FIG. 7 shows a diagram of the result of a conventional backprojection SAR algorithm for the simulated scene shown in FIG. 6.
Figure 8:
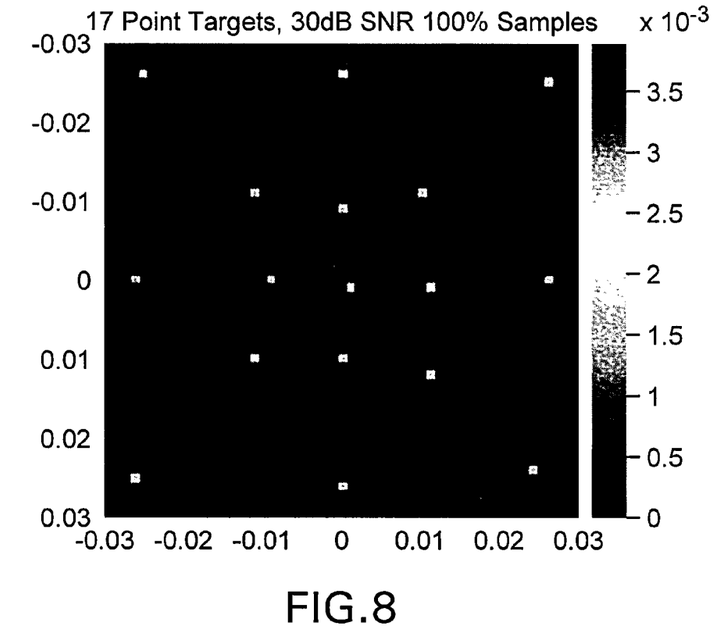
FIG. 8 shows a diagram of the radar method according to the present disclosure for the simulated scene shown in FIG. 6.

FIG. 7 shows the results obtained with the traditional backprojection SAR algorithm. FIG. 8 shows the results obtained with the device and method of the present disclosure. As can be seen in FIG. 7 the backprojection algorithm is unable to differentiate among those point targets which are 1 cm away from each other. That is why the inner point targets square appears like a continuous target and not as seven individual point targets, like it happens with the outer square, where the distance among the point targets is 2.5 cm and, therefore, resolvable with the traditional method. Also the 1.5 cm distance between the inner and outer squares can be resolved by the backprojection algorithm. However, the device and method proposed in this disclosure are able to clearly identify and recover all individual targets as can be seen in FIG. 8. Some small misalignment in the position of some of the targets as well as some ghost targets can also be appreciated. These imprecisions can, however, be easily solved with some simple post-processing of the signal.

Figure 9:
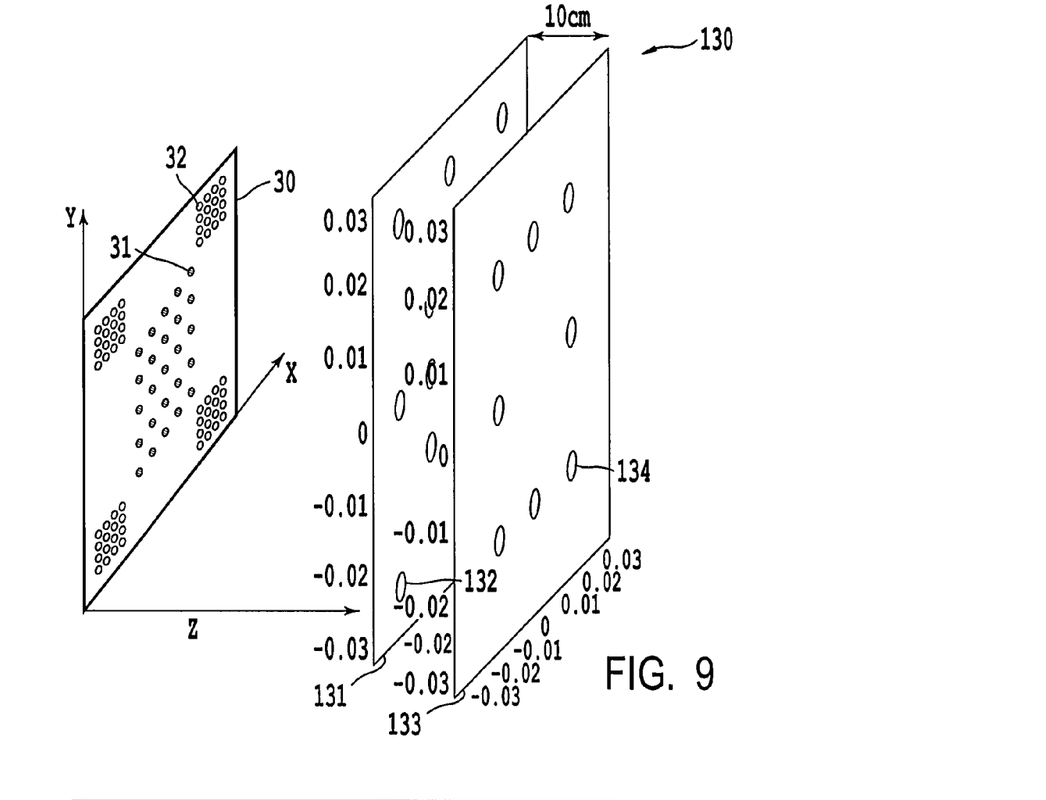
FIG. 9 shows a side view of another simulated scene having two layers.

In a second scenario a second layer has been added to the first scenario with another 8 point targets in a plane 10 cm behind the first scenario shown in FIG. 6. This means, as can be seen in FIG. 9 in a side view of the scene 130 and in FIG. 10 in a front view of the scene 130, that at a distance of 50 cm of the antenna array there is a first layer 131 comprising 17 point targets 132 and at 60 cm distance there a second layer 133 comprising another 8 targets 134.

Figure 10:
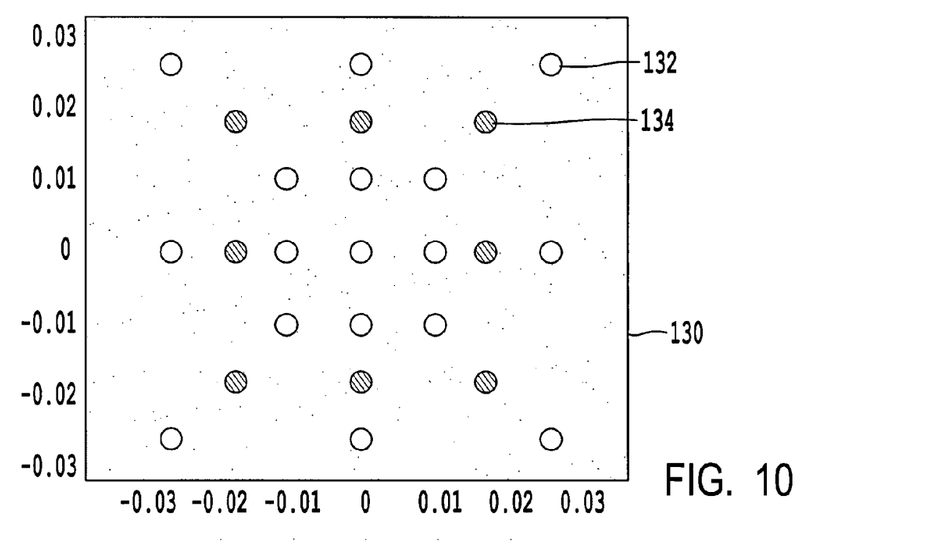
FIG. 10 shows a front view of another simulated scene having two layers.
Figure 11:
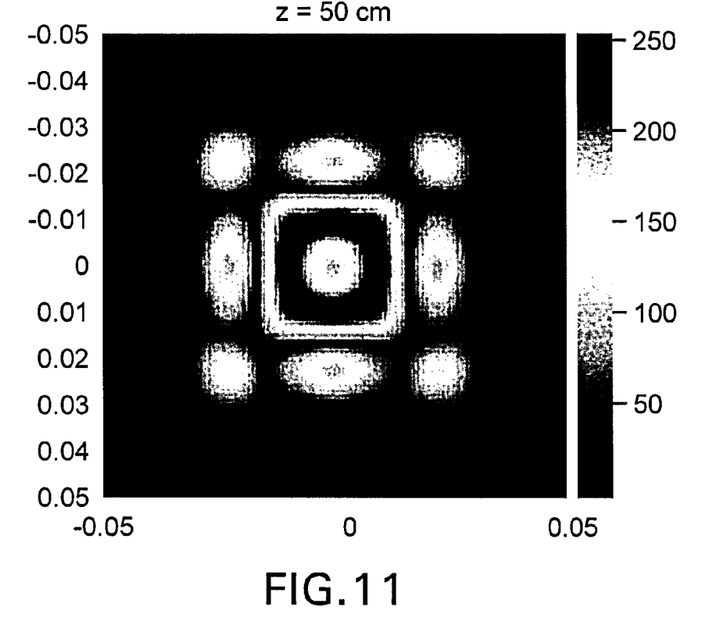
FIG. 11 shows a diagram of the result of a conventional backprojection SAR algorithm for a front layer of the simulated scene shown in FIG. 9.
Figure 12:
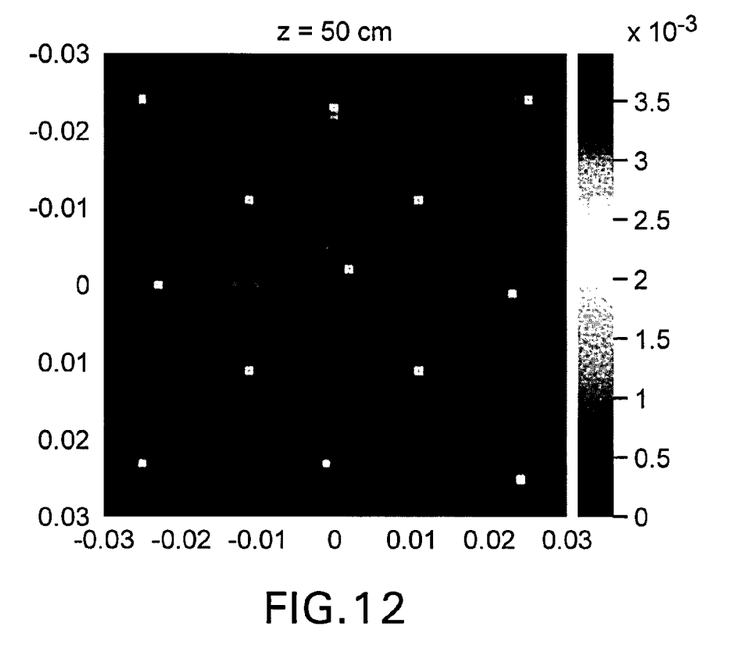
FIG. 12 shows a diagram of the result of the radar method according to the present disclosure for a front layer of the simulated scene shown in FIG. 9.

The simulator uses a bandwidth of 20 GHz which corresponds to a range resolution of 0.75 cm. Therefore, the selected distance of 10 cm between the layers can be clearly resolved by this simulated FMCW radar. The goal of this new scenario is to demonstrate that the idea proposed in this disclosure can be applied independently to each one of the discrete received frequencies corresponding to the different layers in the range direction (i.e. the z direction).

Figure 13:
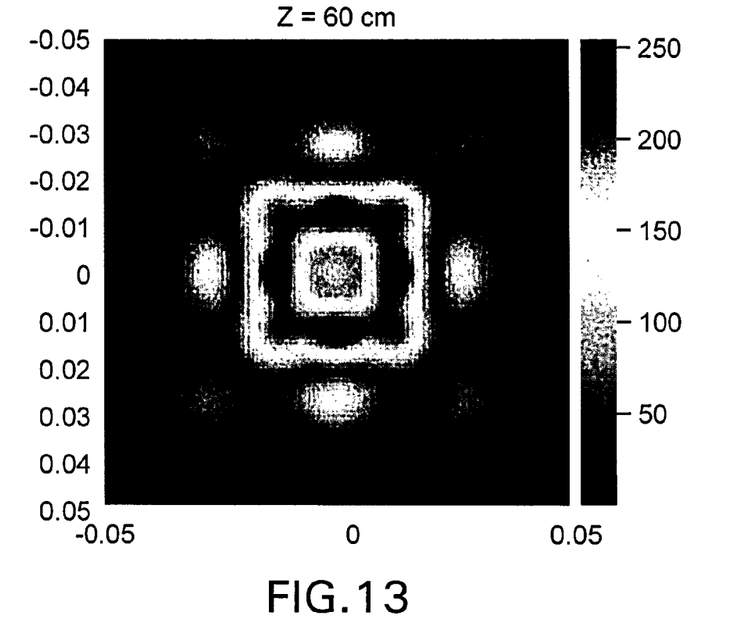
FIG. 13 shows a diagram of the result of a conventional backprojection SAR algorithm for a back layer of the simulated scene shown in FIG. 9.
Figure 14:
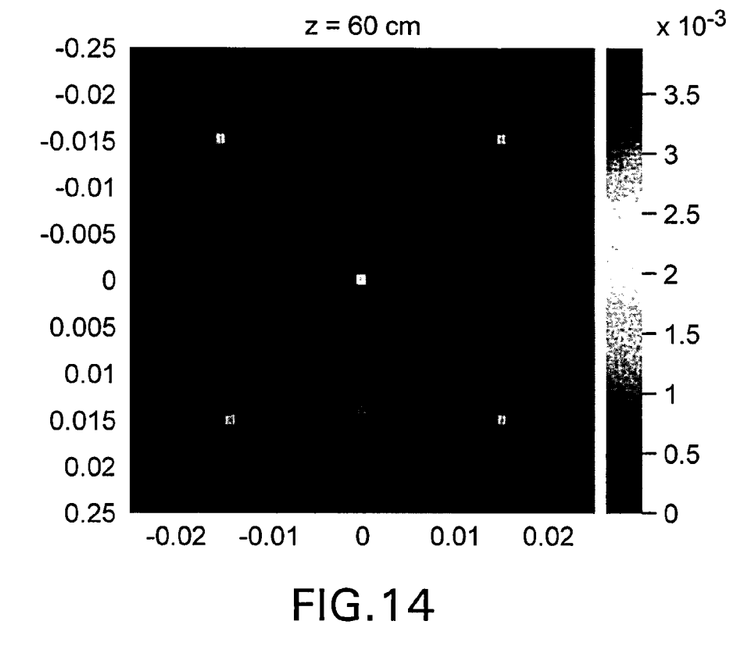
FIG. 14 shows a diagram of the result of the radar method according to the present disclosure for a back layer of the simulated scene shown in FIG. 9.

FIGS. 11-14 show the obtained results with both the backprojection algorithm (FIGS. 11 and 13) and the device and method proposed herein (FIGS. 12 and 14) by means of the application of compressive sensing, for the front layer 131 (FIGS. 11 and 12) and the back layer 133 (FIGS. 13 and 14). Again, the results obtained with the compressive sensing based device and method show superior results independently of the focused layer. Again, some position and uncertainties and target ghosts would need to be corrected with some post processing.

For determining the reflectivity values (and, if desired, positions of targets) of different layers of the scene the processor is configured to focus on a predetermined layer of the scene by setting a distance value for the distance between transmitter antenna and the scene and/or for the distance between the receiver antenna and the scene in the definition of the signal model. In particular, with reference to equation (2) the parameter $z_p$ can be used as distance value indicating the distance between the antenna array 30 and a particular layer (e.g. layer 131) can be set to a desired value in order to focus on said layer. With this setting the described algorithm is performed. In order to focus on a different layer, a different value is assigned to the parameter $z_p$ and the algorithm is performed again with this different value.

Figure 15:
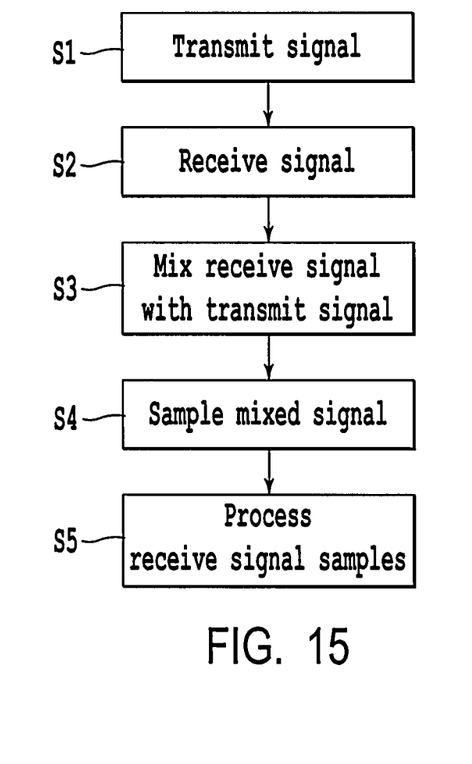
FIG. 15 shows a flow chart of an embodiment of a radar method according to the present disclosure.

FIG. 15 shows a flow chart of an embodiment of a radar method according to the present disclosure. It comprises the steps of

- transmitting (S1) an unfocused frequency modulated transmit signal having a transmit bandwidth towards a scene potentially comprising one or more targets,
- receiving (S2) a receive signal reflected from said scene in response to the transmission of said transmit signal,
- mixing (S3) said receive signal with said transmit signal to obtain a mixed receive signal,
- sampling (S4) said mixed receive signal to obtain receive signal samples from a period of said receive signal,
- processing (S5) said receive signal samples by defining a spatial grid in the scene with a finer grid resolution than obtainable by application of a synthetic aperture radar algorithm on the receive signal samples and determining reflectivity values at grid points of said spatial grid by defining a signal model including the relative geometry of said transmitter antenna and said receiver antenna with respect to the scene, said transmit signal and said spatial grid and applying compressive sensing on said receive signal using said signal model.

The proposed unfocused 2D radar device is able to create a 2D image of a scene with an increased spatial resolution by applying compressive sensing technique as synthetic focus mechanism.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

The elements of the claimed devices and apparatus may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

The invention claimed is:

1. A radar apparatus comprising:
    a transmitter antenna that transmits an unfocused frequency modulated transmit signal having a transmit bandwidth towards a scene comprising one or more targets,
    a receiver antenna that receives a receive signal reflected from said scene in response to the transmission of said transmit signal,
    a mixer that mixes said receive signal with said transmit signal to obtain a mixed receive signal,
    a sampler that samples said mixed receive signal to obtain receive signal samples from a period of said receive signal,
    a processor that processes said receive signal samples by:
        defining a spatial grid in the scene with a particular grid resolution; and
        determining reflectivity values at grid points of said spatial grid by defining a signal model including geometry of said transmitter antenna and said receiver antenna with respect to the scene, said transmit signal, and said spatial grid, and applying compressive sensing on said receive signal using said signal model, and
    a display that displays a reconstructed image of the scene based on the determined reflectivity values,
    wherein said processor is configured to define, for each receive signal sample, a respective signal model using a measurement matrix having:
        a number of columns corresponding to a number of said grid points of said spatial grid, and
        a number of rows corresponding to a number of measurements, the number of measurements being a product of a number of transmit signals times a number of receive signals.

2. The radar apparatus as claimed in claim 1, wherein said processor is configured to determine at least one of a position or reflectivity values of targets comprised in said scene from the reflectivity values determined at the grid points of said spatial grid.

3. The radar apparatus as claimed in claim 1, wherein said transmitter antenna is configured to subsequently transmit a plurality of unfocused frequency modulated transmit signals.

4. The radar apparatus as claimed in claim 1, wherein the transmitter antenna and the receiver antenna are implemented by a single co-located antenna.

5. The radar apparatus as claimed in claim 1, wherein said transmitter antenna comprises a plurality of transmitter antenna elements that each subsequently transmit a respective unfocused frequency modulated transmit signal.

6. The radar apparatus as claimed in claim 1, wherein said receiver antenna comprises a plurality of receiver antenna elements that each receive a respective receive signal reflected from said scene in response to a transmission a respective transmit signal.

7. The radar apparatus as claimed in claim 1, wherein said processor is configured to define a value of a matrix element of said measurement matrix depending on a geometry between a respective transmitter antenna element and a respective receiver antenna element and a corresponding grid point in the scene.

8. The radar apparatus as claimed in claim 1, wherein said processor is configured to focus on a predetermined layer of the scene by setting at least one of a distance value for a distance between the transmitter antenna and the scene or a distance value for a distance between the receiver antenna and the scene in a definition of the signal model.

9. The radar apparatus as claimed in claim 8, wherein said processor is configured to focus on different layers of the scene by:
setting different distance values to define different signal models, and
determining the reflectivity values for the different layers by use of the different signal models.

10. The radar apparatus as claimed in claim 1, wherein said processor is configured to apply a l1-norm minimization algorithm for solving a l1-regularization problem existing when applying said compressive sensing.

11. The radar apparatus as claimed in claim 10, wherein said processor is configured to solve said l1-norm minimization problem by applying a second order cone solver, and
said second order cone solver includes a SeDuMi or SDPT.

12. The radar apparatus as claimed in claim 1, wherein said processor is configured to apply all-norm minimization algorithm for solving a l1-regularization problem in a form:

$$\min\|\sigma\|_1 \text{ s.t. } \|\Phi\sigma - y_k\|_2 \leq \epsilon,$$

where $\sigma$ is a desired solution for a reflectivity vector of the one or more targets, $\Phi$ is the measurement matrix, $y_k$ is a vector of the receive signal samples from the period of said receive signal, and $\epsilon$ represents an accepted error parameter for use as stop criterion for said l1-norm minimization algorithm.

13. The radar apparatus as claimed in claim 1, wherein said processor is configured to apply all-norm minimization algorithm for solving all-norm regularization problem in a form:

$$\min\|\Phi\sigma - y_k\|_2^2 + \lambda\|\sigma\|_1,$$

where $\sigma$ is a desired solution for a reflectivity vector of the one or more targets, $\Phi$ is the measurement matrix, $y_k$ is a vector of the receive signal samples from the period of said receive signal, and $\lambda$ is a regularization parameter.

14. A radar method comprising the steps of:
transmitting, using a transmitter antenna, an unfocused frequency modulated transmit signal having a transmit bandwidth towards a scene comprising one or more targets,
receiving, using a receiver antenna, a receive signal reflected from said scene in response to the transmission of said transmit signal,
mixing said receive signal with said transmit signal to obtain a mixed receive signal,
sampling said mixed receive signal to obtain receive signal samples from a period of said receive signal,
processing said receive signal samples by:
defining a spatial grid in the scene with a particular grid resolution;
determining reflectivity values at grid points of said spatial grid by defining a signal model including geometry of said transmitter antenna and said receiver antenna with respect to the scene, said transmit signal, and said spatial grid, and applying compressive sensing on said receive signal using said signal model; and
defining, for each receive signal sample, a respective signal model using a measurement matrix having:
a number of columns corresponding to a number of said grid points of said spatial grid, and
a number of rows corresponding to a number of measurements, the number of measurements being a product of a number of transmit signals times a number of receive signals, and
displaying a reconstructed image of the scene based on the determined reflectivity values.

15. A processor for use in a radar apparatus having a transmitter antenna that transmits an unfocused frequency modulated transmit signal having a transmit bandwidth towards a scene comprising one or more targets, a receiver antenna that receives a receive signal reflected from said scene in response to the transmission of said transmit signal, a mixer that mixes said receive signal with said transmit signal to obtain a mixed receive signal, and a sampler that samples said mixed receive signal to obtain receive signal samples from a period of said receive signal, wherein
said processor is configured to process said receive signal samples by:
defining a spatial grid in the scene with a particular grid resolution,
determining reflectivity values at grid points of said spatial grid by defining a signal model including geometry of said transmitter antenna and said receiver antenna with respect to the scene, said transmit signal, and said spatial grid, and applying compressive sensing on said receive signal using said signal model; and
defining, for each receive signal sample, a respective signal model using a measurement matrix having:
a number of columns corresponding to a number of said grid points of said spatial grid, and
a number of rows corresponding to a number of measurements, the number of measurements being a product of a number of transmit signals times a number of receive signals, and
said processor is configured to display, on a display of the radar apparatus, a reconstructed image of the scene based on the determined reflectivity values.

16. A non-transitory computer-readable medium having instructions stored thereon which, when carried out on a computer, cause the computer to perform the steps of:
transmitting, using a transmitter antenna, an unfocused frequency modulated transmit signal having a transmit bandwidth towards a scene comprising one or more targets,
receiving, using a receiver antenna, a receive signal reflected from said scene in response to the transmission of said transmit signal,
mixing said receive signal with said transmit signal to obtain a mixed receive signal,
sampling said mixed receive signal to obtain receive signal samples from a period of said receive signal,
processing said receive signal samples by:
defining a spatial grid in the scene with a particular grid resolution;
determining reflectivity values at grid points of said spatial grid by defining a signal model including geometry of said transmitter antenna and said receiver antenna with respect to the scene, said transmit signal, and said spatial grid, and applying compressive sensing on said receive signal using said signal model; and defining, for each receive signal sample, a respective signal model using a measurement matrix having:
  a number of columns corresponding to a number of said grid points of said spatial grid, and
  a number of rows corresponding to a number of measurements, the number of measurements being a product of a number of transmit signals times a number of receive signals, and
displaying a reconstructed image of the scene based on the determined reflectivity values.

* * * * *